Feb. 2, 1954           L. R. GARCIA           2,667,716
FLY TRAP
Filed March 10, 1950                            3 Sheets-Sheet 1
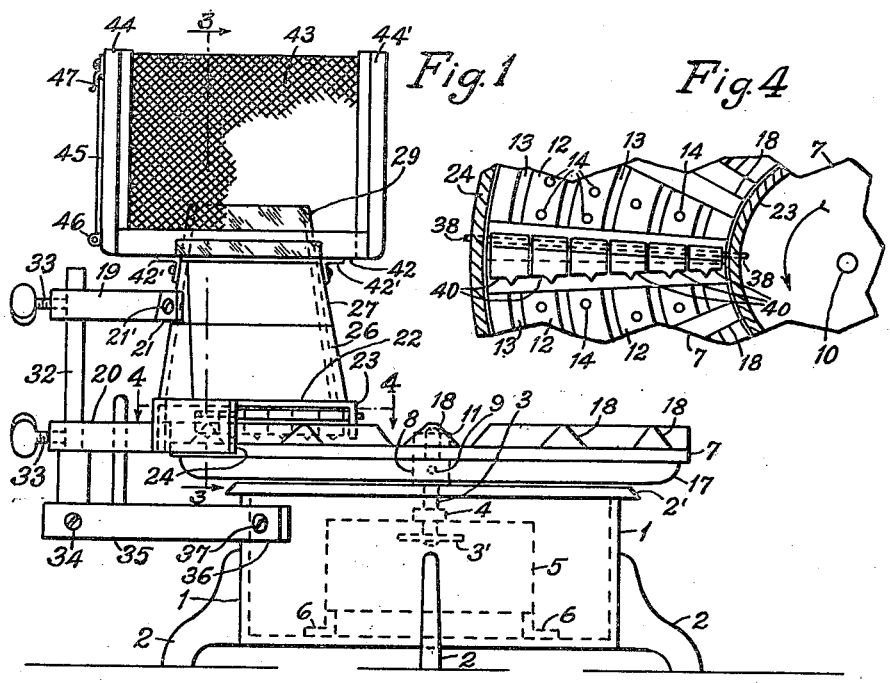
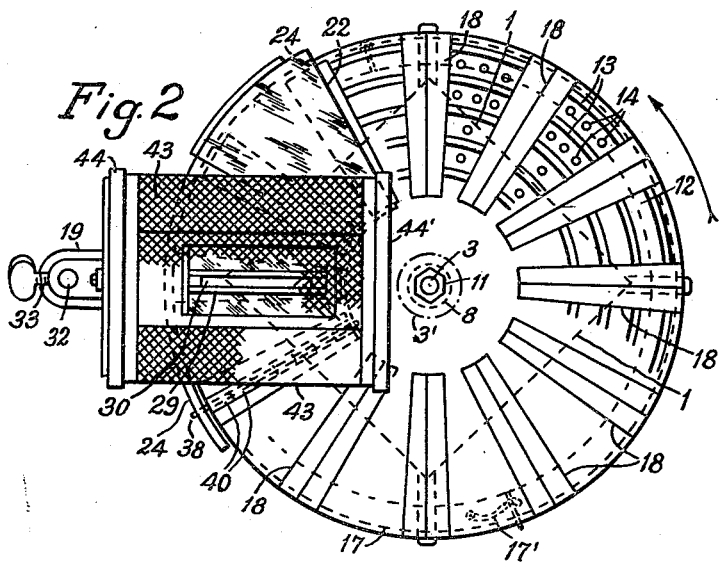
INVENTOR:
Leoncio Riveron Garcia,
BY Singer, Stern & Carlberg,
ATTORNEYS.

Feb. 2, 1954     L. R. GARCIA     2,667,716
FLY TRAP

Filed March 10, 1950     3 Sheets-Sheet 2

Inventor
Leoncio Riveron Garcia
by Singer, Stern & Carlberg
Attorneys

Feb. 2, 1954   L. R. GARCIA   2,667,716
FLY TRAP
Filed March 10, 1950   3 Sheets-Sheet 3
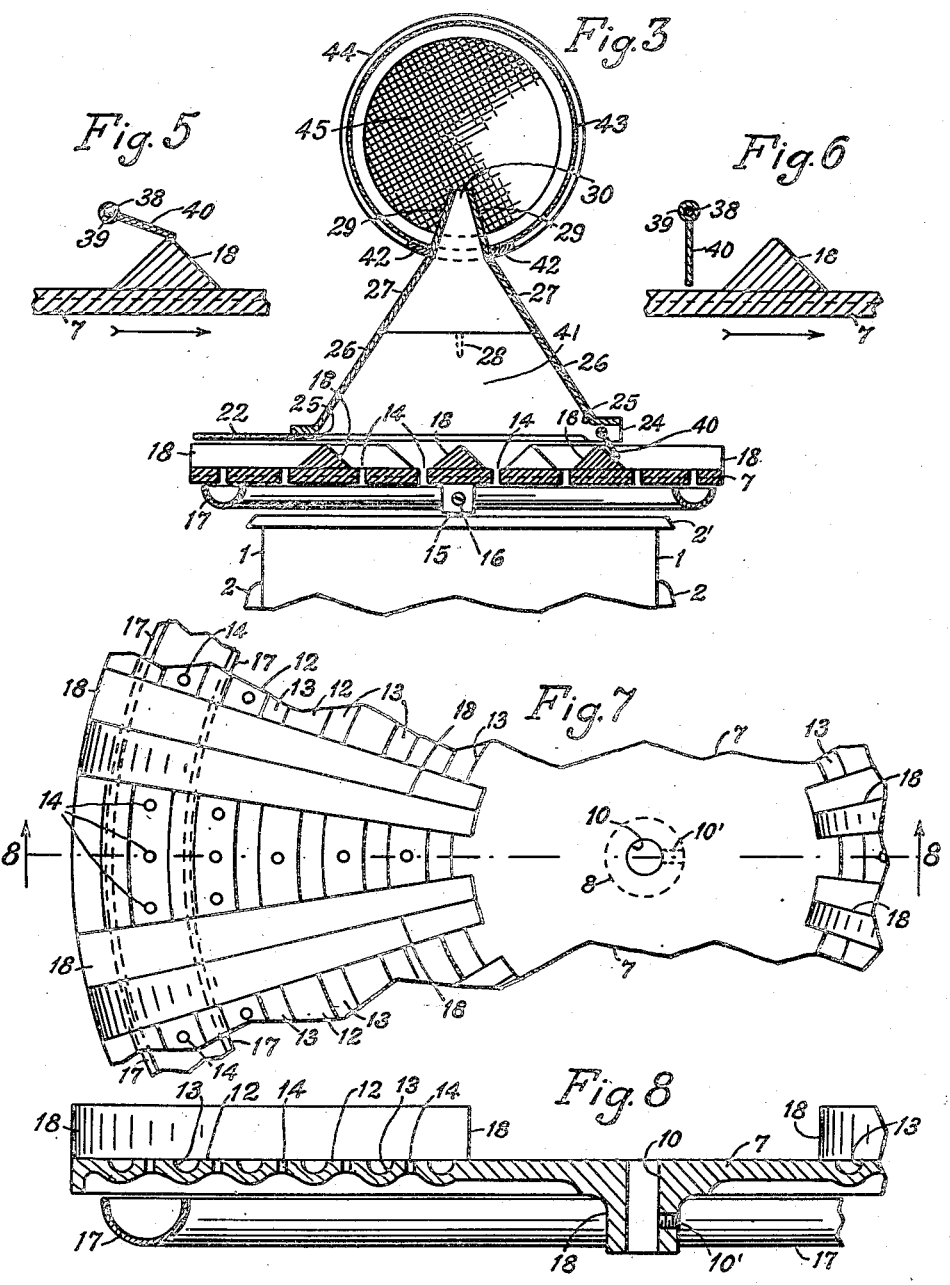
INVENTOR:
Leoncio Riveron Garcia,
BY Singer, Stern & Carlberg,
ATTORNEYS.

Patented Feb. 2, 1954

2,667,716

UNITED STATES PATENT OFFICE 2,667,716

FLY TRAP

Leoncio Riveron Garcia, San José de las Lajas, Cuba

Application March 10, 1950, Serial No. 148,908

2 Claims. (Cl. 43—111)

This invention relates to fly traps, and it has for its object to provide a device of that kind which is provided with a channel adapted to contain a suitable food material having a strong odor to attract said insects and induce them to rest on a rotatable plate which forms part of the device and has corrugations adapted to contain a sweet food material, such as, for instance, honey, whose function is to retain the flies thereon a sufficient period of time so that as the plate is rotated the flies resting thereon will be carried into a dark trap within which the flies upon trying to fly away pass through an illuminated passageway into a cage wherein the flies finally starve. This device is very simple in construction and very efficient in operation to eliminate such insects from rooms, particularly dining-rooms.

The invention is described with reference to the figures of the accompanying drawings, of which:

Fig. 1 is an outer elevational view of the fly trap of this invention.

Fig. 2 is a top plan view of same.

Fig. 3 is a vertical cross-section view on line 3—3 of Fig. 1.

Fig. 4 is a horizontal fragmentary section view on line 4—4 of Fig. 1, showing in detail the position of the oscillating rake disposed on the rotatable plate at one side of the trap to prevent the flies from flying back, once within the trap.

Fig. 5 is a vertical cross-section detailed view of a portion of the rotatable plate, showing the rake in an inclined position to prevent trapped flies from flying out.

Fig. 6 is a detailed view similar to that of Fig. 5, showing the rake in its vertical normal position.

Fig. 7 is an enlarged top plan view of a portion of the rotatable plate, unprovided with the fly trap and cage normally disposed thereon.

Fig. 8 is a diametral vertical section view of the plate on line 8—8 of Fig. 7.

Figure 1A:
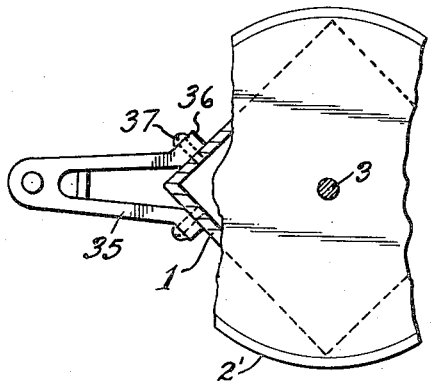
Fig. 1A is a fragmentary plan view of the fly trap in Fig. 1.
Figure 2A:
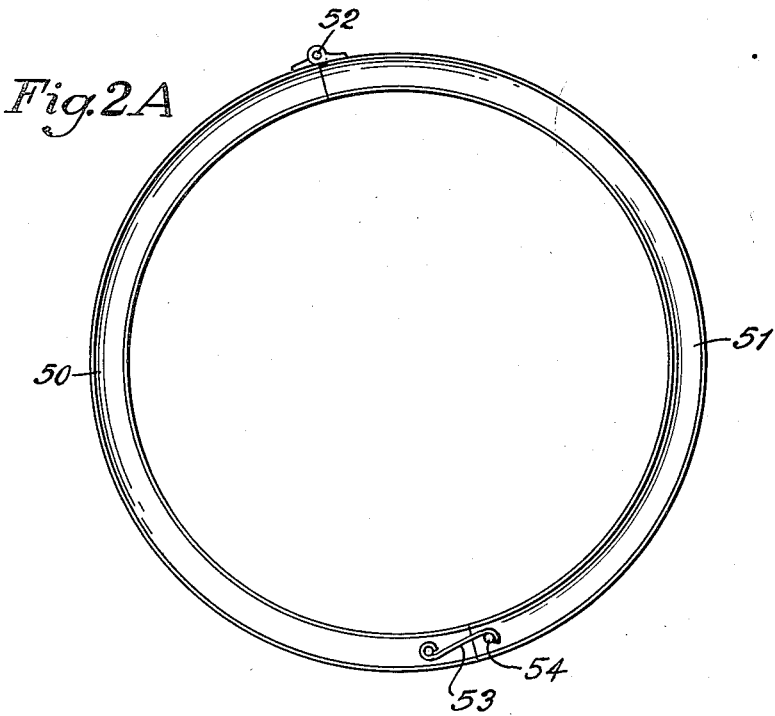
Fig. 2A is a bottom view of the channel 17.

The fly trap of this invention is composed of a box 1 of square horizontal section supported by four legs 2 and closed on top by a detachable lid 2' of circular contour. Across a central opening of said lid 2' passes a vertical shaft 3 supported by a bearing 4 which is fixed on the top portion of a frame 5 mounted by legs 6 on the bottom of box 1 and which carries therein a spring-driven or clock mechanism (not shown) apt to give to the vertical shaft 3 a slow rotatory movement through connection thereof with a gear wheel 3' secured to the shaft 3.

On the upwardly projecting end of the shaft 3 is mounted a circular horizontal plate 7 having a central bushing 8 projecting downward and fitting at its central hole 10 on the top end of the vertical shaft 3 to which it is detachably secured by means of a set screw 9 passing across a thread hole 10' in said bushing 8, the plate 7 being set on top by means of a nut 11 screwed on the top thread end of the vertical shaft 3. Said plate 7 is formed to present a plurality of circular corrugations 12 whose indentations 13 are flush with the top face of the plate 7 and the intermediate portions of the corrugations have a plurality of vertical spaced holes 14 whose function will be hereafter explained. Beneath the plate 7 an annular-shaped channel 17 is detachably suspended by bracket-like supporting pieces 15 projecting downwardly from the lower face of the plate 7, and the channel 17 is secured to said members 15 by screws 16, so that its open top face remains at a short distance from the corrugations 12 of rotatable plate 7. The channel 17 is formed by two half portions 50, 51 hingedly connected at 52 and adapted to be locked together by a latch 17' comprising a member 53 pivotally mounted on the member 50 and adapted to engage a pin 54 on the member 51. Said plate 7 carries on its top face a plurality of barriers formed by spaced apart triangular prisms 18 arranged in radial position and joined to the top face of plate 7 by one of their faces and with the opposed angle thereof projecting a certain height above the top face of plate 7.

A cover in the shape of a circular segment, which is composed of a top horizontal portion 22 made of transparent material and concentric vertical curved flanges 24 at the inner and outer edges of said horizontal portion 22, is hung from the outside of one portion of the rotatable plate 7 by means of horizontal arms of different height 19 and 20 provided with lugs 21 secured by screws 21'. The member 22 has a big opening 23 on the edges of which is mounted a trap in the shape of a prismatic cover with opposedly inclined lateral walls, and which is formed by two sections, i. e. a lower opaque section 26 joined to the horizontal portion 22 and an upper opaque section 27 joined by screws 28 to the lower section 26, the section 27 forming at its top a transparent duct 29 tapered upwards to form a narrow elongated opening 30 for the outward passage therethrough of the flies trapped therein. The arms 19 and 20 are provided with a hole 31 to fit on the vertical bar 32 to which the same are detachably secured by set wing-screws 33, and the widened lower portion of said vertical bar 32 is held in fixed position by means of a horizontal screw 34 passing across holes in the two branches of a supporting piece 35 of A-shape whose branches end in lugs 36 which are secured by screws 37 to the adjacent walls of box 1.

In holes in the vertical walls 24 of the horizontal cover 22 is mounted a horizontal shaft 38 on which are loosely mounted the tubular edges 39 of a plurality of adjacently aligned plates 40 forming a rake which is caused to raise by each horizontal prism 18 upon rotation of the plate 7 and which is then released to remain in the vertical position indicated in Figs. 5 and 6 of the drawings, whereby the flies resting on the corrugations 12 of plate 7 and trapped within the dark chamber 41 will be prevented from flying away from the trap.

On the top duct 29 of trap 26—27 is fitted and secured by angular pieces 42' the closed lower portion 42 of a cylindrical cage made of wiremesh 43 having an open head 44 and a closed head 44', the open head 44 being provided with a wiremesh gateway 45 hinged at 46 to its lower edge and secured in closed position by means of an oscillatable latch 47, said gateway serving to allow the removal from the cage 43 of the dead flies contained therein.

In operating this device, condimented feed is placed within the annular channel 17 and honey is poured into the indentations 13 of the corrugations, and the driving or clock mechanism supported on frame 5 is put in operation. As the plate 7 rotates slowly, the prisms 18 and the plate portions arranged therebetween will pass beneath the lower trap section 26 and the rake 40 will be raised by each prism 18 as the latter passes beneath the lower section 26 of the trap. The flies flying about within the room or space in which the device is installed, will be attracted by the odor of the feed deposited within the channel 17, which odor will be perceived above the plate 7 through the holes 14 of plate 7. As the indentations 13 of the corrugations 12 are full of honey which is greatly desirable to flies, the latter will be induced to rest on the intermediate portions of the corrugations 12 to suck the adjacent honey material, and in such position the flies are carried to beneath the lower section 26 of the trap. Flies trying to fly away from the dark chamber 41 of the lower section 26 will be prevented from so doing by the oscillating rake 40. In fluttering about to escape from the dark chamber 41, the flies will enter the opening 29 of duct 28 which is illuminated by outer light in virtue of the transparent or translucid nature of its walls, and will be trapped within the cage 43 wherein they finally starve.

It is obvious that changes may be made in the nature of the driving mechanism for the rotatable plate as well as in the construction details and arrangement of the trap and the cage disposed thereon, without thereby altering the essential character of the invention which is such as claimed hereinafter.

What I claim is:

1. In a fly trap, a frame, a horizontal disc rotatably mounted in said frame and provided with annular recesses in the top surface thereof and with a plurality of holes between said annular recesses, a plurality of barriers of triangular prismatic shape having an upwardly projecting angle and being secured to the upper surface of said disc in spaced apart radial position, a box-like trap mounted on said frame immediately above a section of said disc and having an open bottom, an annular upwardly open channel beneath said disc, and means detachably securing said channel to said disc.

2. In a fly trap, a frame, a horizontal disc rotatably mounted in said frame and provided with annular recesses in the top surface thereof and with a plurality of holes between said annular recesses, a plurality of barriers of triangular prismatic shape having an upwardly projecting angle and being secured to the upper surface of said disc in spaced apart radial position, a box-like trap mounted on said frame immediately above a section of said disc and having an open bottom, a flap depending from said trap in a radial position in relation to said disc, means hingedly securing said flap to said trap to allow it to be swung aside by engagement with said barriers, an annular upwardly open channel beneath said disc, and means detachably securing said channel to said disc.

LEONCIO RIVERON GARCIA.

References Cited in the file of this patent

UNITED STATES PATENTS

| Number | Name | Date |
|---|---|---|
| 113,515 | Hardy | Apr. 11, 1871 |
| 120,449 | McGowan | Oct. 31, 1871 |
| 173,021 | Kidder | Feb. 1, 1876 |
| 544,831 | Schmittle | Aug. 20, 1895 |
| 577,855 | Hays | Mar. 2, 1897 |
| 1,135,710 | Murphy et al. | Apr. 13, 1915 |

FOREIGN PATENTS

| Number | Country | Date |
|---|---|---|
| 7,345 | Holland | Dec. 15, 1922 |